(12) United States Patent
Gorman et al.

(10) Patent No.: US 6,967,612 B1
(45) Date of Patent: Nov. 22, 2005

(54) SYSTEM AND METHOD FOR STANDOFF DETECTION OF HUMAN CARRIED EXPLOSIVES

(76) Inventors: John D. Gorman, 706 Fulton Ave., Falls Church, VA (US) 22046; Robert J. Douglass, 12001 Westwood Hills Dr., Oak Hill, VA (US) 20171; Thomas J. Burns, Jr., 1448 Cola Dr., McLeon, VA (US) 22101

( * ) Notice: Subject to any disclaimer, the term of this patent is extended or adjusted under 35 U.S.C. 154(b) by 3 days.

(21) Appl. No.: 10/970,465

(22) Filed: Oct. 22, 2004

(51) Int. Cl.[7] .................. G01S 13/88; G01S 13/04; G01S 13/66; G01S 13/86
(52) U.S. Cl. .............. 342/22; 342/27; 342/52; 342/53; 342/54; 342/55; 342/58; 342/89; 342/90; 342/91; 342/93; 342/175; 342/176; 342/179; 342/188; 342/189; 342/195; 342/59
(58) Field of Search .................. 342/22, 27, 28, 342/52–59, 74–103, 175, 176, 179–181, 342/188–197; 324/239, 647; 340/568.1

(56) References Cited

U.S. PATENT DOCUMENTS

| | | | |
|---|---|---|---|
| 3,707,672 A * | 12/1972 | Miller et al. ............... | 324/239 |
| 3,713,156 A * | 1/1973 | Pothier ....................... | 342/22 |
| 4,975,968 A * | 12/1990 | Yukl ........................... | 324/647 |
| 5,073,782 A * | 12/1991 | Huguenin et al. .......... | 342/179 |
| 5,081,456 A * | 1/1992 | Michiguchi et al. ........ | 342/22 |
| 5,227,800 A * | 7/1993 | Huguenin et al. .......... | 342/179 |
| 5,455,590 A * | 10/1995 | Collins et al. ............. | 342/179 |
| 5,557,283 A * | 9/1996 | Sheen et al. ............... | 342/179 |
| 5,592,170 A | 1/1997 | Price et al. | |
| 5,829,437 A | 11/1998 | Bridges | |
| 5,859,609 A * | 1/1999 | Sheen et al. ............... | 342/179 |
| 6,057,761 A * | 5/2000 | Yukl ........................... | 340/568.1 |
| 6,243,036 B1 | 6/2001 | Chadwick et al. | |

(Continued)

OTHER PUBLICATIONS

Cory et al., "Radar-Based Intruder Detection for a Robotic Security System", SPIE Proc. 3525:Mobile Robots XIII and Intelligent Transportation Systems, Boston, MA, Nov. 1-5, 1008, pp. 62-72.

(Continued)

*Primary Examiner*—Bernarr E. Gregory
(74) *Attorney, Agent, or Firm*—Richard C. Litman

(57) ABSTRACT

The system and method for standoff detection of human carried explosives (HCE) is a portable system that automatically detects HCE up to a range of 200 meters and within seconds alerts an operator to HCE threats. The system has radar only, or both radar and video sensors, a multi-sensor processor, an operator console, handheld displays, and a wideband wireless communications link. The processor receives radar and video feeds and automatically tracks and detects all humans in the field of view. Track data continuously cues the narrow beam radar to a subject of interest, the radar repeatedly interrogating cued objects, producing a multi-polarity radar range profile for each interrogation event. Range profiles and associated features are automatically fused over time until sufficient evidence is accrued to support a threat/non-threat declaration hypothesis. Once a determination is made, the system alerts operators through a handheld display and mitigates the threat if desired.

46 Claims, 10 Drawing Sheets

U.S. PATENT DOCUMENTS

| | | |
|---|---|---|
| 6,342,696 B1 | 1/2002 | Chadwick |
| 6,359,582 B1 | 3/2002 | MacAleese et al. |
| 6,366,232 B1 | 4/2002 | Liedtke et al. |
| 6,480,141 B1 * | 11/2002 | Toth et al. .............. 342/22 |
| 6,507,309 B2 * | 1/2003 | McMakin et al. ............ 342/22 |
| 6,507,366 B1 | 1/2003 | Lee |
| 6,703,964 B2 * | 3/2004 | McMakin et al. ............ 342/22 |
| 6,720,905 B2 * | 4/2004 | Levitan et al. ................ 342/22 |
| 6,765,527 B2 * | 7/2004 | Jablonski et al. ........... 342/193 |
| 6,791,487 B1 * | 9/2004 | Singh et al. ................. 342/22 |
| 6,825,456 B2 * | 11/2004 | Chadwick et al. .......... 342/188 |
| 6,831,590 B1 * | 12/2004 | Steinway et al. ............. 342/22 |

OTHER PUBLICATIONS

Pastore et al., "Mobile Robots for Outdoor Security Applications", American Nuclear Society, 8$^{th}$ International Topical Meeting on Robotics and Remote Systems (ANS'00), Pittsburg, PA, Apr. 25-29, 1999, pp. 1-16.

Everett, H.R., "Robotic Security Systems", IEEE Instrumentation & Measurement Magazine, Dec. 2003, pp. 30-34.

* cited by examiner

SYSTEM AND METHOD FOR STANDOFF DETECTION OF HUMAN CARRIED EXPLOSIVES

BACKGROUND OF THE INVENTION

1. Field of the Invention

The present invention relates to devices, systems and methods for remotely detecting concealed weapons, and particularly to system and methods for remotely detecting human carried explosives.

2. Description of the Related Art

The U.S. military and homeland security officials are keenly interested in new technologies that remotely detect Human Carried Explosives (HCE). The archetype threat is the suicide bomber. For example, on Mar. 2, 2004 three human suicide bombers detonated in a crowd in Baghdad, killing fifty-eight people and wounding more than two hundred. Other countries also have an interest in detecting terrorists carrying explosives on their person. Since September 2000, suicide bombers have killed over three hundred seventy-five Israeli civilians in over ninety separate attacks.

U.S. military commanders believe similar attacks will be carried out against military targets, and have placed a high priority on protecting forces from suicide bomber threats at home and abroad. Civilian law enforcement and corrections authorities are also highly interested in concealed weapons detection technologies. For example, the National Institute of Justice (NIJ) has funded the development of hidden weapon detection technology that works reasonably well when the subject is within fifteen meters of the detector. However, this range is well within the lethal zone of an HCE device, making such technologies ineffective for deployment for military force protection.

The ability to detect HCE devices concealed under clothing at distances up to one hundred meters would be extremely beneficial to military commanders concerned with protecting forces from human suicide bombers. By design, these weapons are impossible to detect visibly.

Many new technologies, including non-lethal suppression devices, are being developed to stop threats as they enter the mitigation zone. In addition, a great deal of effort is underway to improve existing technologies capable of identifying concealed threats at close-in ranges up to fifteen meters. These include infrared, ultrasound, X-ray, magnetometers, and imaging radars.

However, infrared sensing is impractical due to very small temperature contrasts between a hidden weapon and outer layers of clothing. Ultrasound is inexpensive and readily available; however, it is less effective at penetrating heavy clothing than radar. X-ray and magnetic portal detectors have proven much more effective at detecting both metallic and non-metallic concealed weapons, but portal detection technologies are inherently limited by the inability to operate such devices at a distance.

Currently, no technologies exist to reliably detect HCE devices at standoff (safe evacuation) ranges. According to Explosive Ordinance Disposal guidelines, the safe evacuation distance is proportional to the cube root of the device weight multiplied by a destruction factor that varies with munitions type. A typical suicide bomber payload consisting of thirty pounds of explosive surrounded by fragmentary shrapnel yields a safe evacuation distance of approximately one hundred meters. Similarly, a Claymore mine with a shaped charge has a safe evacuation distance of approximately one hundred meters, whereas a car bomb typically has a safe evacuation distance of four hundred fifty-seven meters.

Although radar easily reaches potential threats at safe evacuation distances (standoff ranges), devices lacking metal fragmentation are transparent to conventional radar solutions. Moreover, conventional radar solutions that rely on radar cross section (RCS) measurements alone cannot reliably discriminate between humans, humans with body clutter (e.g., cell phone, belt buckle, etc.), and humans carrying fragmentation and explosives.

In order to separate a potential detection from random materials in the background environment of a potential threat and to localize a detection to a specific individual, a sensor is required having a small enough field of view so that it has enough resolution on a single individual being interrogated as a potential threat that a positive detection can be associated with the individual separate from his background and other individuals around him. Solving this problem requires a sensor with a relatively narrow field of view (FOV) of approximately a one-half to one degree visual arc at 100 meters if the sensor's FOV is going to correspond to one individual person. Such a narrow FOV requires some precise method for pointing the sensor at potential threats.

To examine a useful field of regard (FOR), for example, 600 of visual arc, the sensor must be moved sequentially to every potential individual who might be carrying an explosive device. Returns from vehicles, buildings, signs, and other objects in the background must be ignored. Many proposed detection systems postulate a skilled human operator to point the device at individual potential threats to solve this problem. However, suicide bombers have been observed to have been driven near to their target by accomplices and then to have exited the vehicle and to have run to their target and detonate. Consequently, the time to detect and interdict a suicide bomber may be only tens of seconds, and a practical system will have a method to continuously scan and examine all potential threats in a field of regard. Examining and identifying individual people at distances greater than 25 meters and rapidly pointing a narrow FOV detection sensor at each in turn covering a wide FOR every few seconds is beyond the capability of human operators in situations with more than a few potential threats.

In addition to requiring the human operator to point the sensor precisely at numerous potential threats in rapid succession, previously proposed systems also require that a skilled human operator simultaneously examine the output of the sensor to make a subjective judgment as to the likelihood that a given person is a threat. It is unlikely that any proposed system will be effective if more than a few people could be in the field of regard at any one time. In order to meet these demanding timelines of precise pointing and analysis of the sensor's output, a system that provides a method to cue a narrow field of view sensor in a rapid, precise, and automated fashion and that has a method for automatically accessing the likelihood of a threat based on processing of the narrow FOV sensors signals is required.

Bomb detection technologies generally fall into two categories: direct methods designed to detect high explosives based on chemical properties, and indirect methods that look for anomalous signatures associated with bomb devices. None of these techniques are capable of detecting HCE threats at standoff ranges.

Direct methods for bomb detection exploit the fact that high explosives contain large amounts of nitrogen and oxygen in their molecular composition. Both bulk and trace detection methods use sampling methods designed to measure the chemical properties of the material, and both require that the material be placed in close proximity to the sensor. The main application of direct explosive detection methods is in portal systems.

Bulk detection methods measure the interaction between the sample under investigation and a penetrating radiation wave, such as ionizing radiation or electromagnetic radiation. Bulk detection methods can be used on sealed packages, including concealed threats. However, methods that use ionizing radiation may not be suitable for use in screening of human subjects.

Trace detection methods are based on direct interaction with the material and require that some amount of the explosive be present on the outside of the package in the form of particle residue or vapors. Both canines and gas chromatography methods ingest vapors and hence need to be close enough to the suspect article to acquire a sample of the vapor. Particle-based detection methods, such as laser ionizing mass spectroscopy, use optical methods for interrogating samples, but detector noise limitations require that the sample be proximal to the laser.

Indirect detection methods are designed to detect anomalies in human signatures that are consistent with concealed bomb devices. As with direct detection methods, the current standard practice is limited to short-range or portal based systems. Metal detectors are used to detect the presence of metal fragmentation and are of questionable use against devices that do not employ metallic fragmentation. Thermal and passive millimeter wave (MMW) systems exploit the fact that human skin reflectivity differs from that of metal or explosive materials. Both thermal and MMW radiation pass through clothing. Passive imaging systems collect an image of devices concealed under clothing in outdoor settings using the illumination of the cold sky. Imaging devices require trained operators to point the device and interpret the images, resulting in an increase in labor and privacy concerns, and in longer times to check each potential threat.

Various devices have been developed applying the above principles. U.S. Pat. No. 4,975,968, issued to T. Uki in December 1990, discloses a dielectrometry monitoring method and apparatus for three-dimensional profiling and colorable imaging of the material contents of articles carried on a conveyor belt. U.S. Pat. Nos. 5,073,782 and 5,227,800, issued to Huguenin et al. in December 1991 and July 1993, respectively, disclose a contraband detection system suitable for detecting concealed non-metallic contraband, such as ceramic or plastic weapons or illegal drugs using quasi-coherent millimeter wave radiation. The Huguenin system is an active imaging system designed for detecting contraband on a conveyor belt with a constant background at close range. Polarized returns are used by an operator to adjust contrast with the background, and a skilled operator is required to interpret the images as the conveyor scrolls objects past the sensor.

U.S. Pat. No. 5,177,445, issued to T. Cross in January 1993, discloses a method by which particular non-metallic materials are detected by recognizing the way in which their electrical properties vary with the frequency of an applied alternating electric field. U.S. Pat. No. 5,592,170, issued to Price et al. in January 1997, discloses a frequency-agile, narrow-instantaneous bandwidth radar system which detects objects and discriminates between different types of objects from a safe stand-off distance. The field of regard, however, is fixed and is dependent upon manual sweeping of an area under surveillance by a skilled human operator. A skilled operator would have difficulty in accurately pointing and tracking a person with a 1° radar beam at ranges greater than short standoff distances. In the Price system, the discrimination of threats is also performed manually by a skilled human operator.

Unlike the previous devices that detect concealed weapons, U.S. Pat. No. 5,829,437, issued to J. Bridges in November 1998, discloses a system and method by which cancers in heterogeneous tissue is located and detected by using the backscatter signal returns from microwave radiation. Unlike the previously disclosed devices, the '437 device is not a stand-off device and requires contact with the patient.

U.S. Pat. Nos. 6,243,036 and 6,342,696, issued to G. Chadwick in June 2001 and January 2003, respectively, disclose methods and apparatuses for detecting objects by comparing the differences in amplitudes of polarized radiation reflecting off a target illuminated with low-power polarized radiation with a predetermined value representative of an expected difference if the object were not present. The Chadwick patents are specifically illustrated by examples devoted to the detection of handguns, generally from laboratory studies, and do not address the problem of focusing the radar over a wide field at ranges up to one hundred meters or greater, and do not address the problem of detecting and identifying human subjects at such ranges, nor the problem of detecting nonmetallic objects by radar.

U.S. Pat. No. 6,359,582, issued to MacAleese et al. in March 2002, discloses a weapons detector utilizing a hand-held radar system and signal processor to detect the presence of a plurality of self-resonant frequencies in the backscattered signals of a target between 4–15 yards. Although suitable for guns and similar devices, HCE devices must be detected at a much greater stand-off distance.

The aforementioned devices have a fixed field of regard and require an operator to direct the field of regard of the sensor upon the subject matter. U.S. Pat. No. 6,507,366, issued to H. Lee in January 2003, on the other hand, is a device that automatically tracks a moving object using a camera having a zoom lens, an auto focus lens and a charge-coupled device for converting an image into electrical signals. The disclosure, however, is silent on how the device manipulates multiple moving targets.

Articles entitled "Radar-Based Intruder Detection for a Robotic Security System", Cory, et al., SPIE Proc. 3525: Mobile Robots XIII and Intelligent Transportation Systems, Boston, Mass., 1–5 November 1998, pp. 62–72, "Mobile Robots for Outdoor Security Applications", Pastore et al., American Nuclear Society 8$^{th}$ International Topical Meeting on Robotics and Remote Systems (ANS'99), Pittsburgh, Pa., 25–29 April 1999, and "Robotic Security Systems", Everett, H. R., IEEE Instrumentation and Measurement Magazine, December 2003, pp. 30–34 describe a robotic system for the detection of intruders in storage yards, arsenals, and the like. The system includes an infrared/vision based system (FLIR) and a millimeter wave radar at 77 GHz slaved to the vision system on a two-axis pan and tilt mechanism. The vision system is stepped across a field of interest, and when motion is detected, a target track is established. The vision system is used to define geometric shape and angular location, and Doppler radar pulses provide range and speed of movement, which are fused to establish a radar cross section and to confirm target and range. The system has been reported successful in detecting a human at ranges of 100 m–300 m. A scanning radar is added to the system for 360° detection of other potential targets while the system is tracking an initial target.

None of the above inventions and patents, taken either singly or in combination, is seen to describe the instant invention as claimed. Thus, the system and method for standoff detection of human carried explosives of the present invention solving the aforementioned problems is desired.

SUMMARY OF THE INVENTION

The system and method for standoff detection of human carried explosives (HCE) automatically detects HCE at ranges between 10 m–200 m, preferably about one hundred meters, and within seconds alerts an operator to HCE threats. The system and method employ a polarized radar system emitting a narrow beam, preferably between about 0.5° to 1°, to detect either fragmentation or nonfragmentation explosives by comparison of the energy differential between co-polarized and cross-polarized reflections from a target to reference values of similar targets not carrying explosives. In a first embodiment, the system and method employ radar only, operated in either a scan mode or a track mode, mounted on a pan and tilt two-axis gimbal, and software for assessment of the target threat. In a second embodiment, the system and method use a vision-based sensor collocated with the radar to detect and assess the target threat.

The system is preferably low-cost and/or portable, and may include a multi-sensor processor, an operator console, and a wide-band wireless communications link to a handheld display. The multi-sensor processor receives video feed from at least one camera and automatically detects and tracks all humans in the field of view. Using track data to continuously cue the narrow beam radar to a subject of interest, the radar repeatedly interrogates cued objects, producing a multi-polarity radar range profile for each interrogation event.

Range profiles and associated features are automatically fused over time until sufficient evidence is accrued to support a threat/non-threat declaration hypothesis. Once a decision is made, the system alerts operators through a wireless handheld display.

The vision-based system may be any imaging system, and may include at least one Ladar, Lidar, infrared, multispectral, hyperspectral, or imaging radar output signal instead of or in addition to a video output signal. The radar system may be dual polarized with either HH (horizontal transmit-horizontal receive) and HV (horizontal transmit-vertical receive), or VV (vertical transmit-horizontal receive) and VH (vertical transmit-horizontal receive), alternating polarization (HH and HV alternating with VV and VH), fully polarimetric (HH, VV, HV and VH), or may use either right or left circular polarization.

The differential between the co-polarized reflection and the cross-polarized reflection may be a simple difference in energy levels, but is preferably calculated as a ratio referred to as an extract RF discriminant.

Accordingly, it is a principal object of the invention to provide a system and method for standoff detection of human explosives that protects stationary and mobile positions from concealed human-carried explosives from a range outside a blast zone of the explosives.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
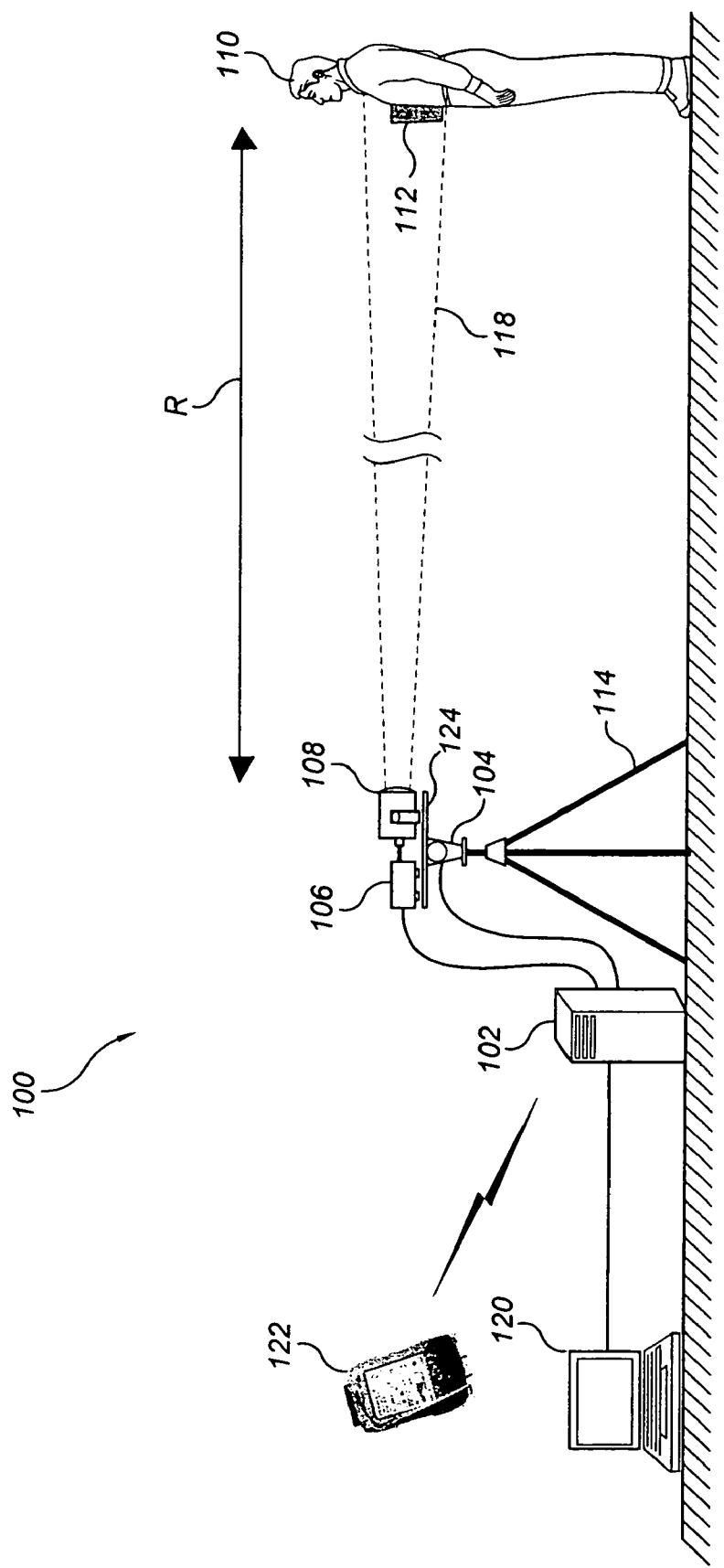
FIG. 1 is an environmental view of a system for standoff detection of human carried explosives according to the present invention utilizing radar alone.

The present invention is a Human Carried Explosive Detection system and method for standoff detection of human carried explosives (HCE). The "System" has several embodiments and is designed to automatically detect HCE out to a range of between about ten meters to two hundred meters, preferably about one hundred meters, and within seconds alerts an operator to HCE threats.

The human chest gives a characteristic scattered response signature when excited by the electromagnetic field produced by radar. This chest wall response signature is modified when non radar-transparent objects, such as explosive devices or concealed weapons, are placed on or near the chest. Signature modification can take the form of additional energy returns from highly reflective components (metal objects) or attenuation if the device obscures the radar view of the chest.

Most clothing types have a relatively low dielectric constant and are highly transparent over a wide range of radar frequencies. The body, on the other hand, is highly conductive, since it contains a large fraction of water. Research regarding the measurement of the radar reflectivity of various tissue types has been performed which characterizes specific absorption rates of RF energy in the context of Electro Magnetic (EM) radiation hazard analysis. Measurements and models place the radar cross-section (RCS) of a human at roughly one square meter, or equivalent to the radar return from a perfectly conducting metal sphere with a diameter of one meter.

When a hidden threat device is concealed on or near the chest wall, the radar view of the chest wall can become obscured and there is the possibility of collecting a radar return from the device, either directly or indirectly, as in the case of an interaction between the chest wall and the device.

Obscuration of the chest induces changes in the expected chest wall signature. Direct radar returns from a threat device placed between the chest wall and the radar produce near-range returns that appear closer to the radar and can be separated from the chest wall return. The HCE Detection System detects the induced changes in the return RF signature from the chest wall due to non radar-transparent objects, both reflective and non-reflective.

The present inventors have conducted tests with 3-D geometric models of a six-foot human using three dielectric layers that model the electrical properties of skin, subcutaneous or fatty tissue, and muscle tissue. The tests were conducted on a model not carrying explosives, a model equipped with a suicide bomber vest carrying, fragmentation explosives, and a suicide bomber vest carrying explosives only without fragments. When illuminated with a 77 GHz radar beam, both the fragmentation explosives model and the explosives only model showed a 30 dB energy gain over the bare torso in a cross-polarized channel (VH) as compared to a bare torso. Similarly, the ratio of co=polarized energy to cross-polarized energy for a bare torso was significantly higher than for the fragmentation explosives and explosives only model over a wide range (about 60°) of look angles. Consequently, humans carrying explosives, whether fragmentation explosives or explosives only, can be detected with at least a dual polarized radar system. The problem is to focus a narrow beam (between 0.5° to 1°) of polarized radiation on a target within a wide field of regard to obtain sufficient look angles to confirm a threat at standoff distances automatically and within as short a time period as possible to effectuate evacuation or mitigation measures.

Figure 8A:
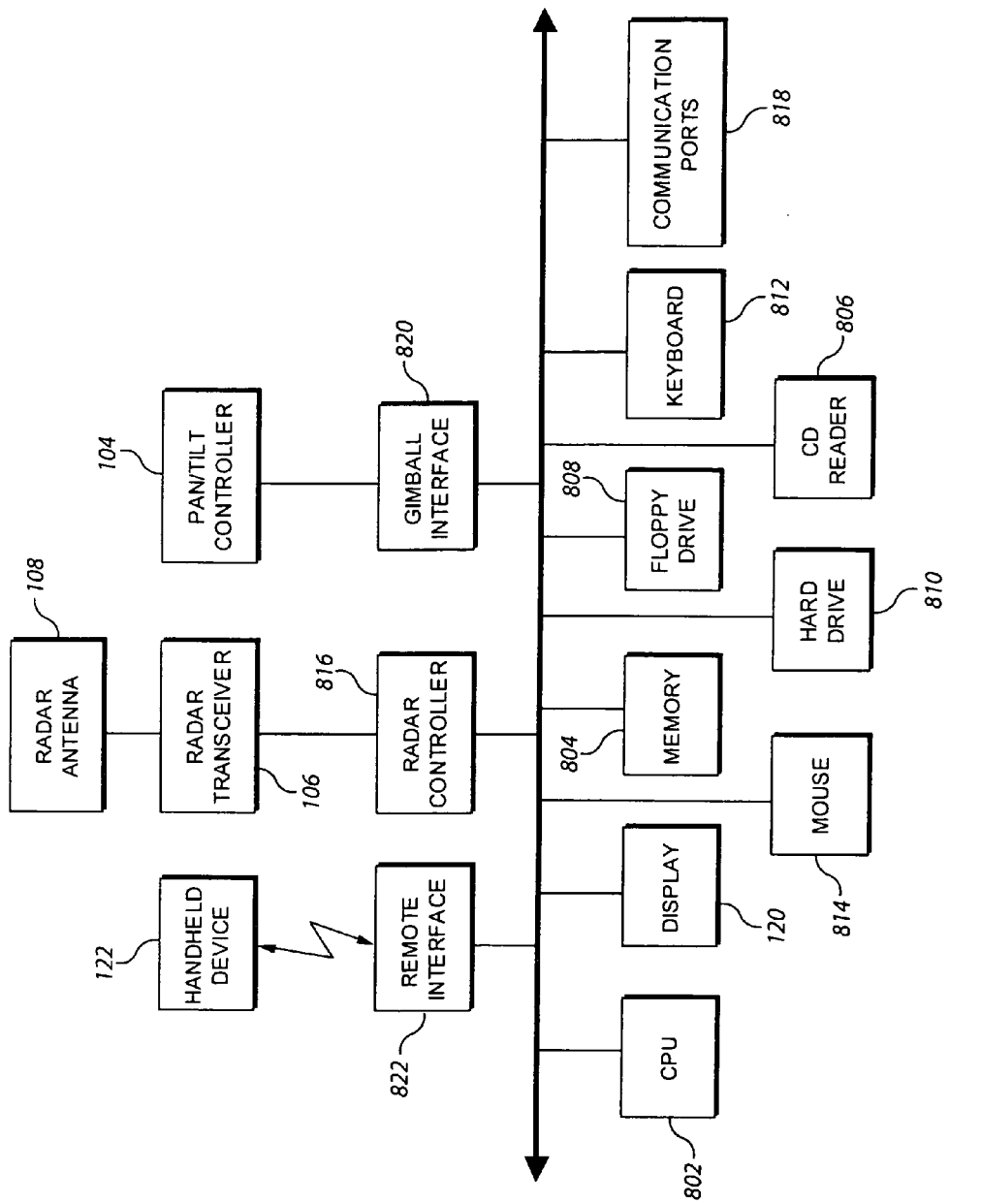
FIG. 8A is a block diagram of the radar only detection system of FIG. 1.

FIG. 1 and the system block diagram of FIG. 8A illustrate the radar-only embodiment 100 of the System. The radar-only embodiment 100 of the System is lightweight, portable, and includes a radar system mounted on a sensor platform 124, a computer system 102 connected to the radar system, and an operator console 120.

The radar system includes a radar transceiver 106 electrically connected to at least one radar antenna 108. The radar transceiver 106 is comprised of a transmitter portion and a receiver portion, and upon command of a radar controller 816 in computer 102, the radar transceiver 106 and antenna 108 transmit a narrow beam radar towards a field of regard 118, thereby illuminating the subject 110 and threat device 112 with electromagnetic radiofrequency (RF) energy. The beam is polarized, either horizontally, vertically, or with right or left circular polarization.

The sensor platform 124 is mounted to a portable stand 114 by a gimbal 104 such that a pan/tilt controller 104 in computer 102 may automatically adjust the position of the platform 124.

The computer 102 has an architecture similar to that of commercially available computers, and includes, at a minimum, a keyboard 812, a pointing device 814, random access memory (RAM) memory 804, and central processor unit (CPU) 802. The program instruction code implementing the HCE detection and tracking algorithms is recorded onto standard computer readable medium and loaded into memory using a compact disk (CD) reader 806 or floppy disk drive 808. Alternatively, the program instruction code may be read directly from another computer via a standard communication port 818 available on most computers. The communication port 818 may be a network connection enabling real-time collaboration between multiple HCE detection systems in the tracking and detection of human carried explosives.

In addition to the standard computer interfaces, the computer 102 has a radar controller 816, which under control of the program instruction code triggers the radar and digitizes analog data received from the radar receiver portion of the radar transceiver. Furthermore, the computer 102 contains an interface 820 to the pan/tilt two-axis gimbal 104 that controls the horizontal and vertical positioning of the sensor platform 124.

Reliable radar-based detection of hidden HCE 112 requires collecting several RF signature measurements of the subject 110 as it is moving within the radar field of regard 118. Two reasons for this are collection geometry and scintillation. There is no guarantee that the explosive device 112 will be visible from the radar look direction given an arbitrary view of a subject 110 (i.e., if their back is toward the sensor 108). However, as the system tracks the subject 110 in the radar's field of regard, number of opportunities to gain favorable views of the HCE device 112 increases. Additionally, radar signatures of man-made objects and clutter can be highly variable due to the specular nature of returns from flat surfaces and the effect of constructive and destructive interference between coherent scatterers that lie in adjacent range bins.

In operation, the radar assembly is steered via commands to the gimbal controller 104 sent from the processor 102 so that the main-lobe of the radar beam 118 intersects the subject 110 and threat device 112 at a nominal standoff range R of one hundred meters. Energy scattered off of the subject 110 and threat device 112 is collected at the antenna 108, sent to the transceiver 106, and converted to digital format by the processor 102. Signal processing algorithms hosted on the processor 102 are then used to automatically classify the return signal as "threat" or "non-threat."

Still referring to FIG. 1, the operator console function and user interface may consist of a standard display terminal 120 connected to computer 102. Alternatively, the operator's console 120 may be a portable or notebook computer having a display, keyboard and pointing device electrically connected to the computer 102 via a hardwired or wireless link. Finally, notifications such as a warning and indication and associated video signal may be sent to a remote field operator for viewing on a wireless handheld computer 122 over a wireless broadband communication link.

Figure 2:
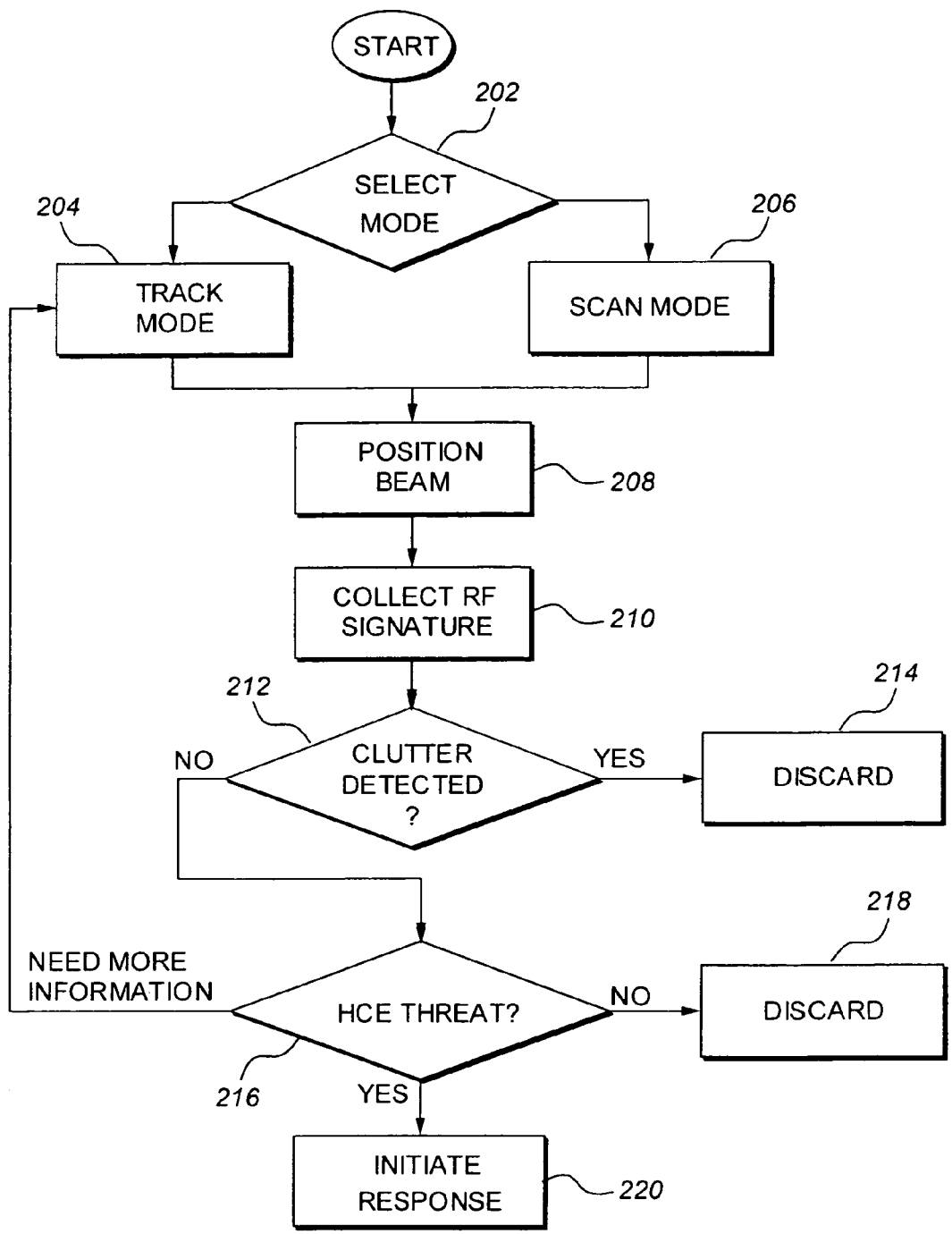
FIG. 2 is a flowchart showing the steps of a method for using the system of FIG. 1.

FIG. 2 is a flowchart representing the processing performed by the radar-only embodiment 100 of the System. Two modes of operation are available in the radar-only embodiment 100: scan-mode 206 and track mode 204. An operator initiates the system by selecting the desired operation mode 202. In scan mode 206, the operator defines a scan pattern consisting of the azimuth and elevation extent of the radar field of regard, a sweep rate and a radar pulse repetition frequency (PRF). The scan pattern generator software within processor 102 uses these parameters to generate a sequence of radar control signals that drive the radar beam position control module 208 and triggers the radar transceiver 106.

Track mode 204 has two operator-selected modes: manual and automatic. Manual mode allows the operator to steer the radar beam using a joystick, trackball, keyboard or similar two-axis control input. In manual track mode, the operator has a further option as to the mode of radar triggering: either manual triggering or automatic triggering with a user selected PRF. In automatic track mode error signals are fed back from the radar and used in an adaptive scan pattern to maintain the beam on moving subjects. As with the manual track mode, the user selects a desired radar PRF.

Figure 5:
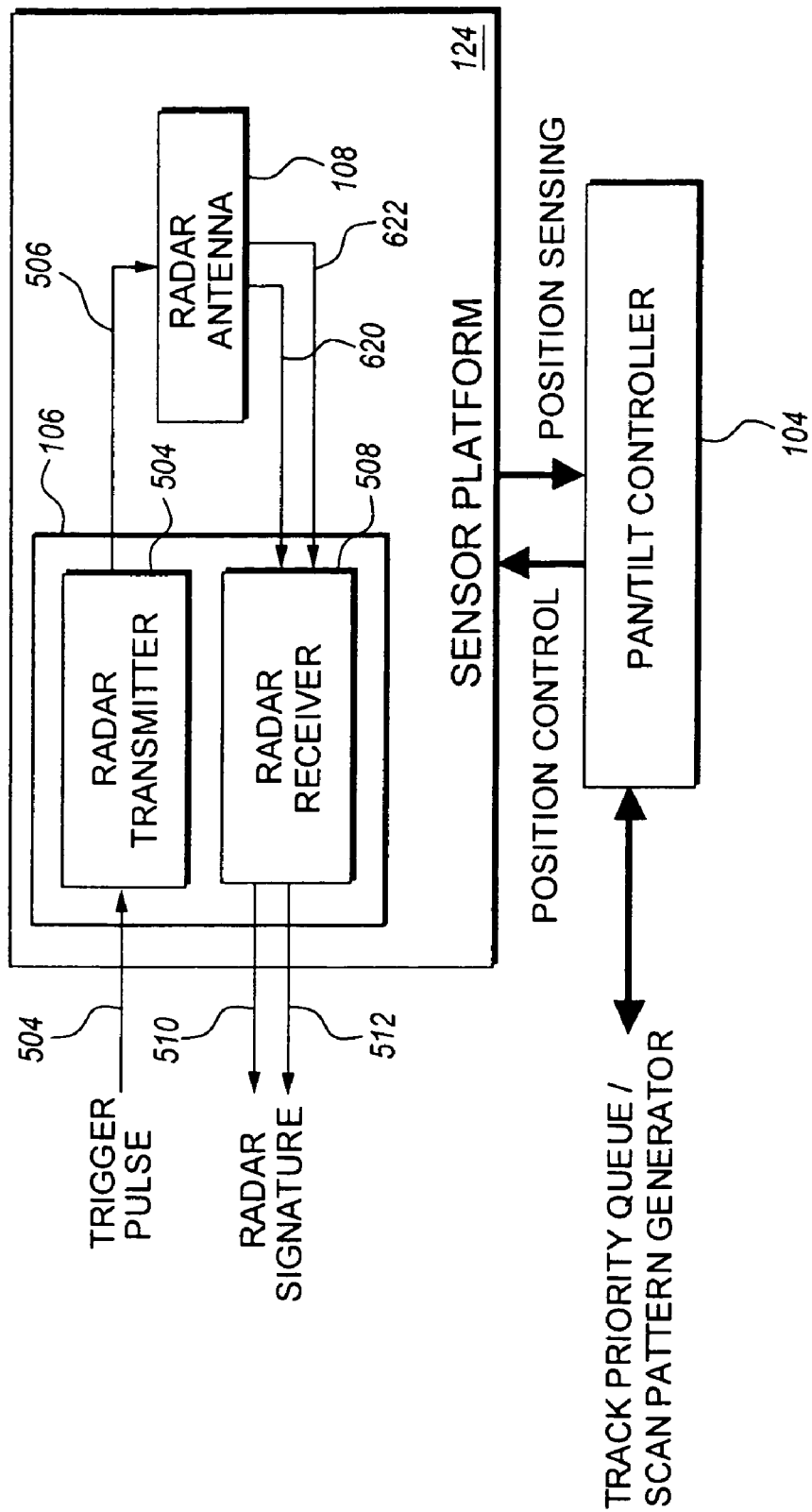
FIG. 5 is a block diagram illustrating the radar system and pointing control detail of a system according to the present invention.

FIG. 5 illustrates a high-level block diagram of the sensor platform 124 with the radar transceiver 106 and radar antenna 108 mounted thereon. When the radar transceiver 106 is triggered, the antenna 108 launches RF energy at the heading set by the beam position coordinates supplied by the scan-mode 206 or track-mode 204 controllers. After the radar has been positioned, the computer 102 sends a trigger pulse 504 to the radar transmitter portion 502 of the radar transceiver 106. Upon receiving the trigger pulse 504, the radar transmitter 502 generates a signal 506 that is upconverted to millimeter-wave frequencies and is transmitted through the radar antenna 108. Backscattered radar returns 620 and 622 are collected at the radar antenna 108 and sent to the radar receiver portion 508 of the radar transceiver 106 where they are downconverted to baseband and digitized. Digital radar signature data is then transmitted to the processor via digital data streams 510 and 512 to the processor 302 along with heading information extracted from the pan/tilt controller 104.

Figure 6:
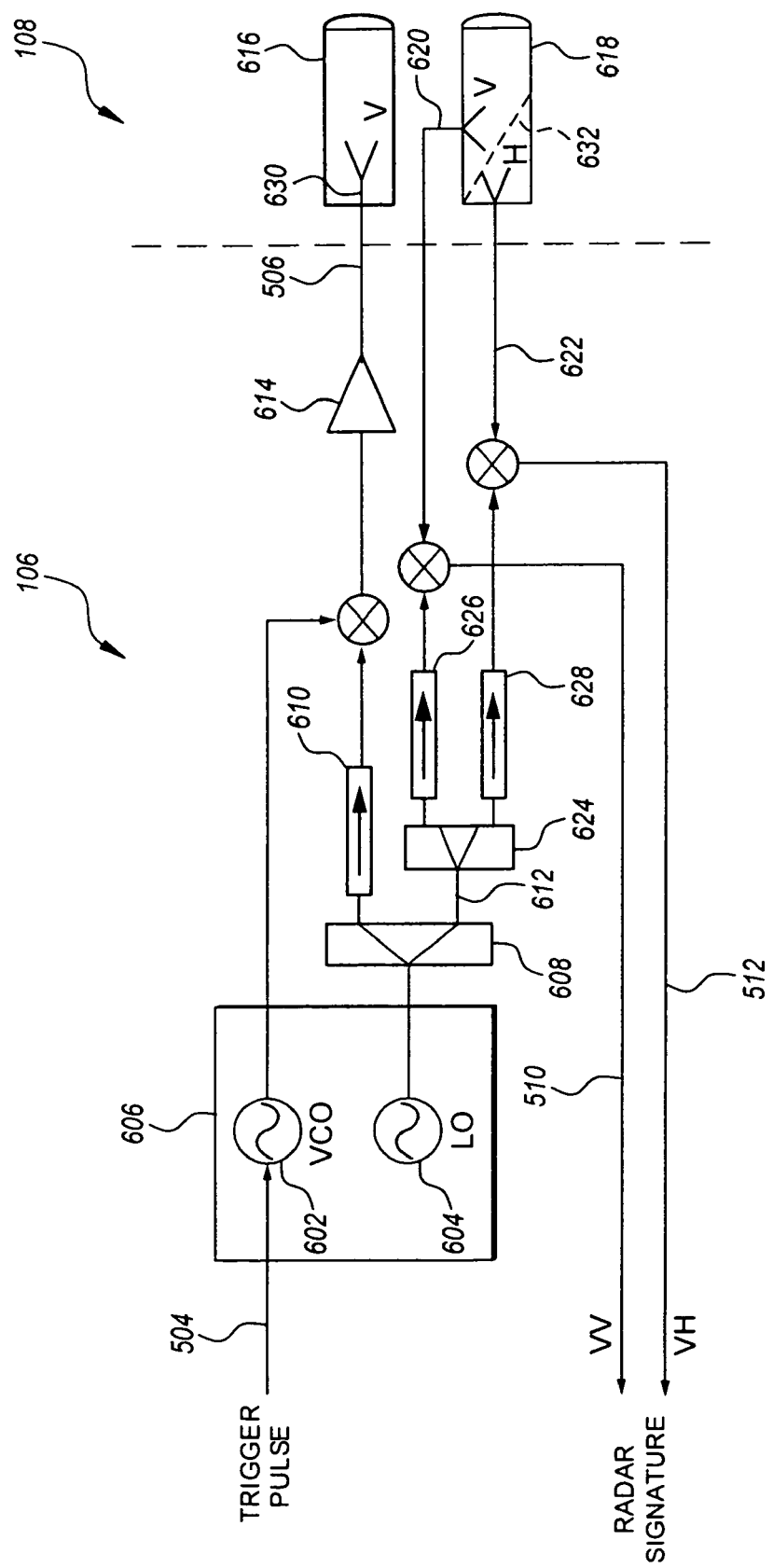
FIG. 6 is a schematic diagram detailing the radar antenna installation according to the present invention.

FIG. 6 illustrates a representative high-level schematic of the radar assembly of transceiver 106 and antenna 108. The radar transceiver 106 incorporates a low-cost, commercially available FMCW (frequency-modulated continuous wave) radar, preferably operating at either a 77 GHz or 94 GHz center frequency, although a center frequency anywhere in the range from about 10 GHz to 110 GHz may be used. A trigger pulse 504 is sent from the radar controller 820. The trigger 504 initiates a voltage-controlled oscillator (VCO) 602 that generates a frequency tone that is swept over a predefined range, $f_{min}$ to $f_{max}$. In the preferred embodiment, the bandwidth, $f_{max}-f_{min}$, is at least 500 MHz and preferably closer to 1 GHz.

In the preferred embodiment, the output of a MMW (millimeter wave) local oscillator (LO) 604 is collocated with the VCO 602 and both oscillators are protected 606 from temperature variations. The output of the LO 604 is split into two parts using a power divider 608. One half of the LO signal is sent through an isolator 610 and then mixed with the VCO output to upconvert the VCO signal to the MMW frequency band. The resulting signal is amplified by a high-gain MMW power amplifier 614 into a signal 506, which is then transmitted through a Gaussian optic antenna 108. For a system operating at a 94 GHz center frequency, the preferred embodiment uses a 12" diameter round antenna 616 with either a vertical or horizontally polarized feed element 630.

The RF signature collection 210 of the backscattered response from objects within the footprint of radar beam 118 may be collected by using a common transmit and receive aperture, as in a mono-static radar system, or using separate transmit and receive apertures, as in a bi-static or multi-static configuration. Furthermore, a multi-element, phased-array antenna and space-time adaptive processing may be deployed. In the preferred embodiment, shown in FIG. 6, the reflected radar signal is collected using a separate receive antenna 618. The receive antenna 618 is a single 12" diameter round Gaussian optic antenna and simultaneously collects both H and V polarizations. Dual polarization collection is accomplished by inserting a polarizing grid 632 in the antenna 618 and splitting the V and H components of the return signal into two different feeds 620 and 622. The two polarizations are down-converted to baseband by being mixed with the same LO used to upconvert the transmitted VCO output. In this case, the other half 612 of the LO outputs after the first power divider 608 is sent through a second power divider 624, each of the two outputs is then sent through an isolator 626 or 628 before being mixed with the two received antenna signals 620 and 622. The resulting signals, in this case, VV 510 and VH 512, are sent to the radar controller 820 where they are converted into digital format via an analog-to-digital converter.

The received radar signals are then processed through two decision stages 212 and 216. The first processing stage is detection 212, in which the return signature is temporally adaptively filtered using a constant false-alarm rate (CFAR) technique to extract range bins where the scattered response energy exceeds the energy of spurious returns caused by clutter and receiver noise. Signals passing the CFAR test are then processed in a subsequent sequential hypothesis testing stage 216 to determine if they are consistent with returns from a threat device 112. Signals that do not pass the CFAR threshold test are discarded 214.

Three outcomes are possible at the output of the sequential hypothesis test 216: "Yes" indicating a definite "threat", "No" indicating a definite "non-threat", and "?" indicating more information is needed. In the event that insufficient evidence is available to support either the "threat" or "non-threat" hypotheses, the processor 102 can direct the operator, if in manual track mode, to hold the radar beam 118 on target until a sufficiently large number of radar samples has been collected to allow a reliable declaration of the threat status. In automatic track mode or scan mode the processor 102 automatically positions the beam 118 until sufficient data is received.

Events that trigger a "threat" determination may then be used to initiate one or more mitigation responses 220 to be discussed later. Information available at the output of the radar-only embodiment 100 of the invention include the estimated range and heading of the threat relative to the radar sensor, as well as the time at which the threat was detected. Additional characteristics, such as velocity vector, radar cross-section and other distinguishing signature features might also be provided to the operator as an aid to intercepting the threat 112. As an example, one may consider continuing the radar track during the interception operation to provide real-time updates of position and heading information on detected threats 112.

The preferred embodiment incorporates a radar system having at least one transmit polarization and at least one receive polarization, i.e., at least a dual polarized system. However, in alternative embodiments the radar system may be alternately polarized, fully polarized, or use left or right circular polarization. In the event of multiple polarizations the span of polarizations will contain an orthogonal pair of either or both of transmit or receive polarizations.

Figure 3:
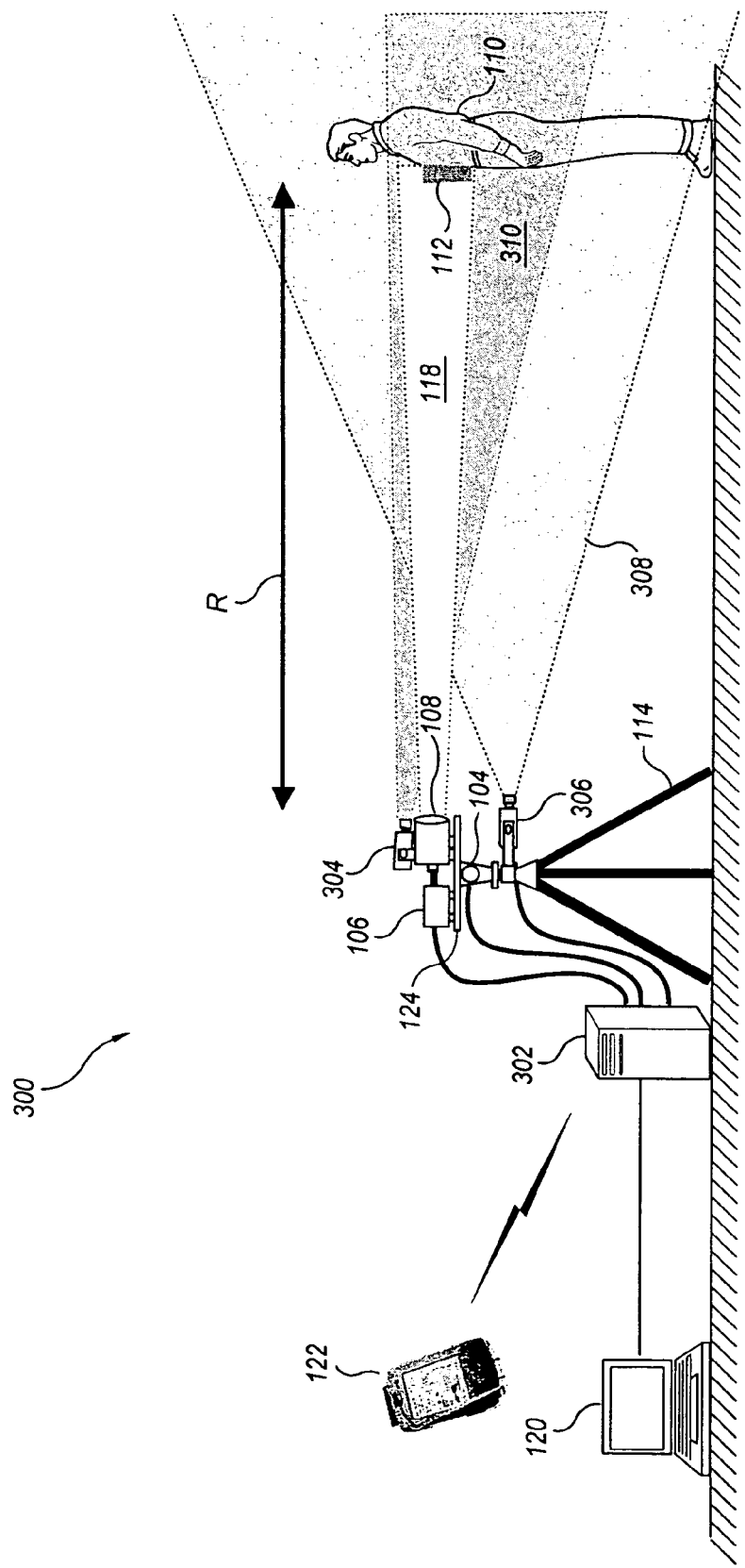
FIG. 3 is an environmental view of a System for standoff detection of human carried explosives according to the present invention which incorporates both radar and video.
Figure 8B:
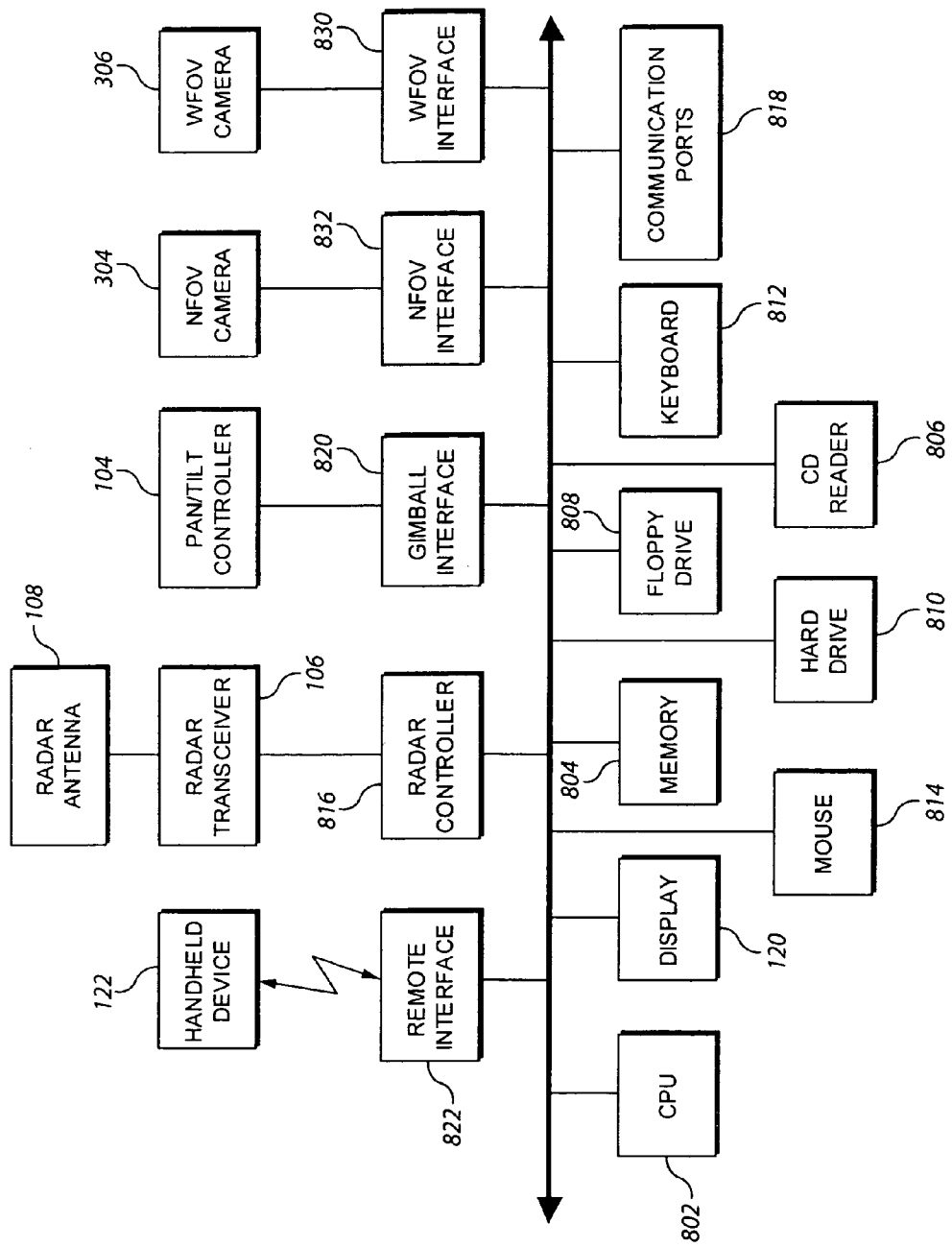
FIG. 8B is a block diagram of the radar with video detection system of FIG. 3.

FIG. 3 and FIG. 8B illustrate an alternative embodiment of the HCE Detection System, which incorporates at least one video camera to improve threat determination and tracking capabilities of the System. In addition to the system components of the radar-only embodiment 100, the radar plus video embodiment 300 includes a fixed, wide field of view (WFOV) video camera 306 that is aimed at the area under surveillance. For greater resolution, a steerable narrow field of view (NFOV) video camera 304 may be mounted on platform 124 and co-boresighted with the radar beam 118. As best illustrated in FIG. 8B, the video outputs of the WFOV camera 306 and the NFOV camera 304, if present, are connected to one of several frame-grabbing interface products 830 and 832 known and available to those skilled in the art. Depending upon system requirements, the cameras 304, 306 may be any combination of black and white, color, infrared, Ladar, Lidar, imaging radar, hyperspectral, or multi-spectral cameras.

It is well within the abilities of one skilled in the art of methods for detecting and tracking humans on foot in RBG (red-blue-green) color video data to extend the methods in order to detect and track people with data from other types of imaging sensors having only one intensity value at each pixel instead of the three intensity values provided by a color video camera. For example, a static background viewed by a stationary camera can represent the background as patterns of light and dark in black/white intensity data from a B/W video camera, a LADAR/LIDAR sensor, or an imaging MMW radar sensor. Moving people in the scene can then be detected by subtracting an average view of the static background intensities from each new frame of sensor data to find foreground pixels that represent a significant change from the background and therefore potential images of people moving in the foreground across the background. Foreground pixels can be grouped and detected as people based on the size and shape of the group of pixels. A detected person can then be tracked across subsequent frames by performing subtraction of the background intensity values.

Similarly, hyperspectral and multi-spectral video cameras can be used to detect humans by subtracting a representation of the background in color space where the data is represented by more than the three colors of a standard RBG video camera. Also, in a similar manner, range images in an angle-angle-range image from a LADAR, LIDAR, or MMW imaging radar can be used to detect and track people by subtracting an average representation of the background in range-image space. Whether these alternative sensors have better detection and tracking performance than standard color video depends on the nature of the scene and the illumination. Improved detection and tracking performance can be obtained by using multiple types of imaging sensors in combination, but at an added expense is incurred by adding additional sensors to the system and additional processors to interpret the data from the additional sensors.

Figure 7:
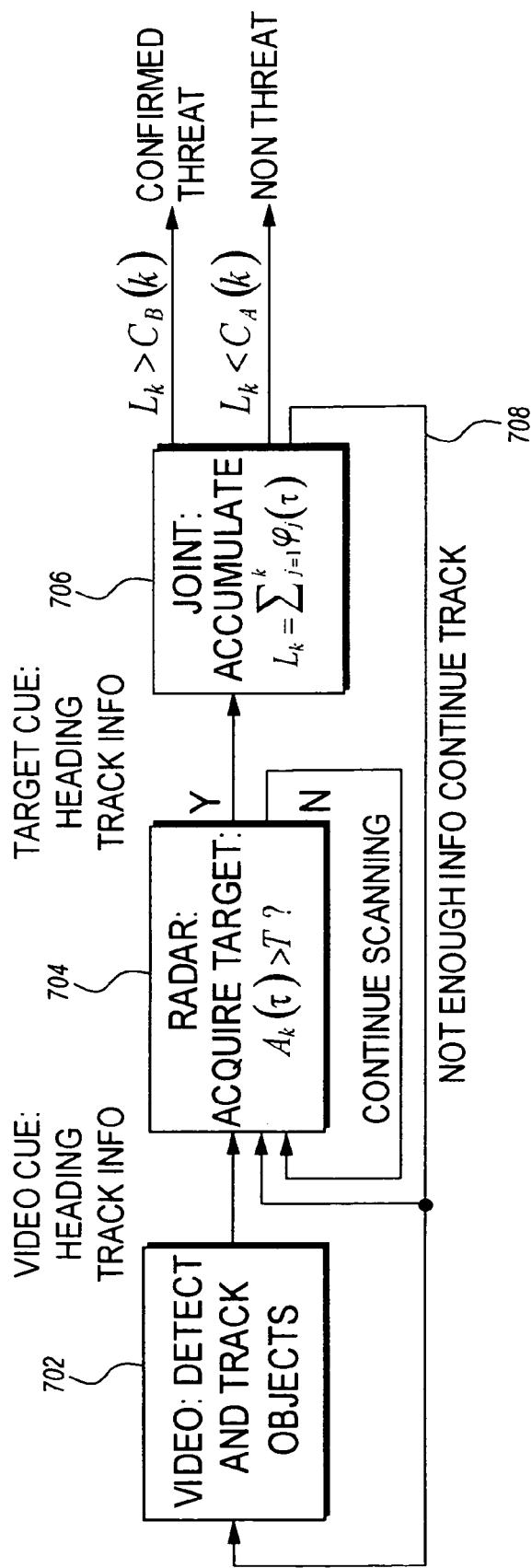
FIG. 7 is a block diagram of a decision process using the system according to FIG. 3.

FIG. 7 is a high level flowchart illustrating the process by which the video system (either one or two cameras) 702, maintains a track on the object until the radar system 704 has accumulated enough evidence to conclusively determine 706 the object's "threat" versus "non-threat" status. In the event that there is not enough evidence to make one of those two declarations, there is a feedback mechanism 708 by which the radar system continues to request track information from the video system. When "non-threat" is declared, the track is dropped from the list of objects being tracked. When "threat" is declared, on the other hand, the detection event and track information is passed back to the video system for final tracking and notification of an operator.

As previously disclosed, in the radar plus video embodiment 300, video signals from the WFOV video camera 306 are operated upon by a video-tracking algorithm stored in program memory that is designed to detect and extract moving subjects from the WFOV camera 306 field of regard 308. The heading of each detected moving subject is estimated, and corresponding pan/tilt position commands are sent to the gimbal 104. Also at this time, the processor 302 sends a trigger to the radar transceiver 106 to initiate the transmission of one or more RF signals through the antenna 108 toward the subject 110 and any threat device 112 present on the subject 110. Energy scattered off of the device 112 and subject 110 is collected at the antenna 108 and forwarded to the transceiver 106, which then transmits the data to the processor 302 where the data is processed using signal detection and classification algorithms.

The signal detection and classification algorithms classify the reflected radar signal as being either "threat" or "non-threat". In the preferred embodiment, the NFOV video 304 refines the track-heading information extracted from within the field of view 308 of the WFOV video data to provide an estimate of the pose and posture of each detected subject 112.

Two modes of operation are available in the radar plus video embodiment 300. In the first mode, referred to as "video cued radar," video motion detection and tracking algorithms implemented in software stored in memory in processor 302 are used to detect, segment and track moving subjects 112 in the video field of view. Track headings of subjects 112 detected in the video stream are used to control the radar beam position 118 and to trigger the radar in order to interrogate the threat status of each tracked object in the video field of view.

In the second operation mode, the radar operates in continuous scan mode with a scan pattern that covers the WFOV video camera 306 field of view 308. Radar pulse returns are tagged with the time and position of the pan/tilt head to allow registration of the radar data to the video sequence, both in time and look angle.

Figure 4:
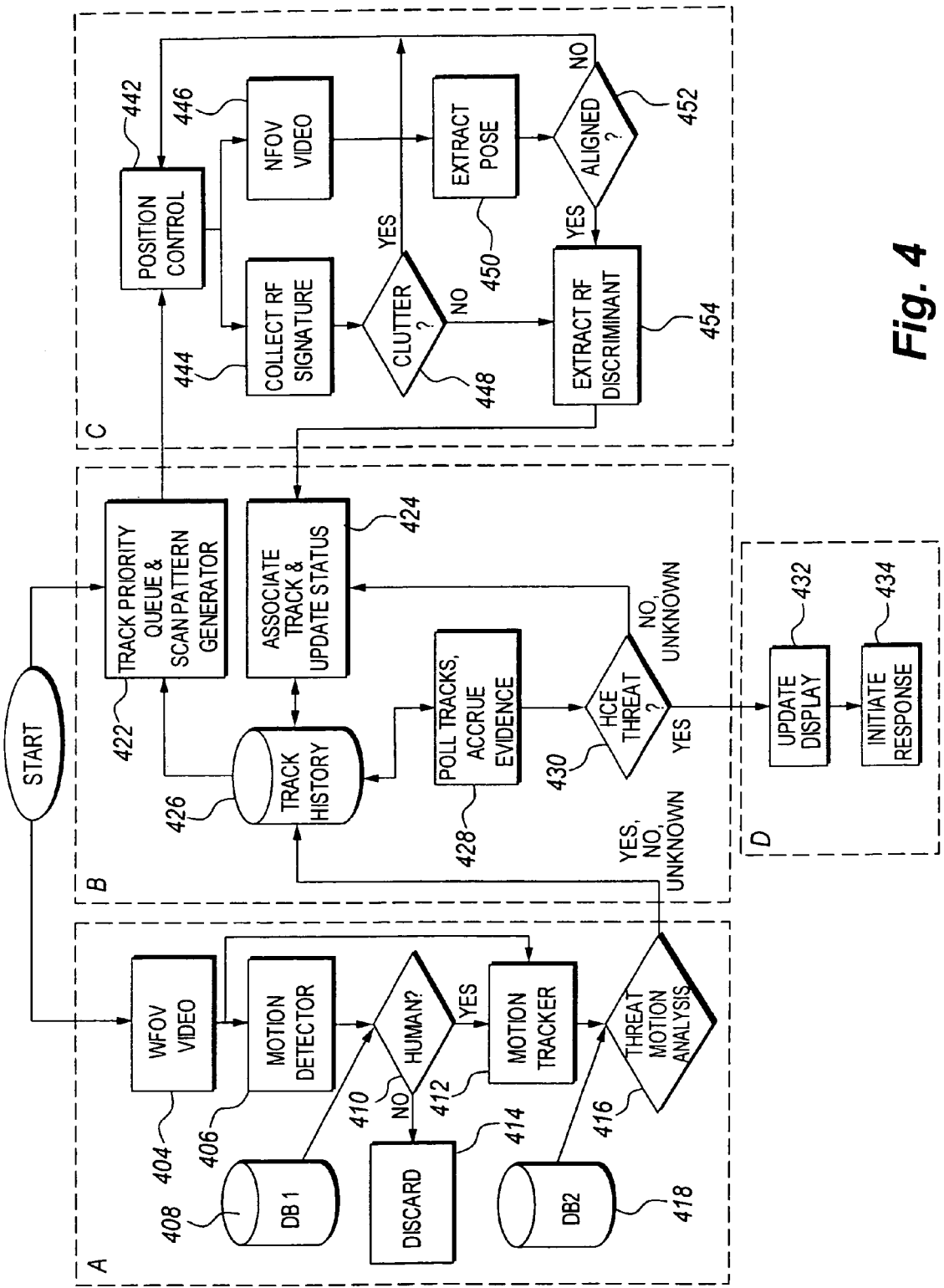
FIG. 4 is a flowchart showing the steps of a method for using the system of FIG. 3.

Whereas FIG. 7 illustrates the high level process by which the radar plus video embodiment 300 tracks and performs threat determination, FIG. 4 illustrates in greater detail the interaction between the video and radar sensors, as well as the HCE threat detection process. The operation of the radar plus video embodiment 300 can be broken down into four blocks A–D. Starting with Block A, at step 404, the WFOV camera 306 collects video data and transmits the data to the processor 302 which applies motion detection and segmentation software implemented algorithms 406 to separate moving objects from stationary background. A two-sided composite hypothesis test 410 is then applied to classify each detected moving object as being "human" or "other." A database of constraints 408 on human characteristics is utilized to classify the object type of each moving object detected. This database 408 contains data elements including, but not limited to size, shape, thermal profile (if applicable for Infrared or multi-spectral cameras) and color (if applicable, for color cameras), and motion as an aid in classifying object type. Moving objects that are not consistent with human motion are discarded from further consideration 414.

Detected moving objects that have been classified as human-like are then sent to the motion tracker module 412 along with the video stream collected by the WFOV camera 306 at step 404. Information passed to the Tracker Module 412 by the Motion Detector Module 406 includes the video frame number, a mask or region of interest delimiters that describe the location of the moving object in the video frame, and the ancillary statistics used in the initial hypothesis test 410. The Motion Tracker Module 412 generates and maintains a track for each object cued by the motion detector 406. Tracks are maintained until the subject 110 leaves the field of view 310 of the WFOV camera 306.

A Threat Motion Analysis Module 416 examines each track based upon a database 414 of stored characteristics, and determines the threat potential of the moving track. Database 414 contains measurements or parameters that have been characterized as threat motions, either by an operator or from analysis of past threats. These characteristics may take the form of region constraints such as, "anybody who enters this demarked area is considered a threat", or may consist of time and region constraints such as, "anybody who enters the demarked area at the wrong time". Other threats could be someone moving toward the protected area at a higher rate of speed than other subjects in the area. An alternate strategy would have the Threat Motion Analysis Module 416 compare the motion statistics of new tracks to database 414 estimates of "normal" motion statistics within the surveillance area to determine if the motion of the tracked object represents an anomaly.

At any one time, a track may be classified as a "threat", a "non-threat", or "indeterminate". The Threat Motion Analysis Module 416 operates to detect dynamic or emerging threats in the presence of uncertainty by applying a sequential hypothesis test. A sequential hypothesis test is a statistic based test known to those skilled in the art of statistics. Unlike a normal hypothesis test which outputs a binary "yes/no" answer, a sequential hypothesis test allows a third answer, "don't know, collect more data." The idea is that at each point in time, you collect additional information until you have enough information to make a decision about a given hypothesis. Preset or operator selected parameters within the sequential hypothesis test enable one to incorporate the cost of collecting more data into the optimization.

With "indeterminate" threats, the hypothesis test 416 is sequentially reapplied with each new observation until a threat determination can be made or the subject has left the field of view. Note that the definition of a threatening motion can vary depending on scenario. Threatening motions could be defined as a subject with a motion vector toward the protected area and/or motion velocities that are markedly different from the average velocity of other subjects in the field of view 308.

Still referring to FIG. 4, Block B includes steps implementing the motion detection and tracking algorithm incorporated in processor 302 and is capable of simultaneously detecting and tracking multiple objects within the field of view 308 of the WFOV camera 306. Motion tracks that are designated as potential threats are forwarded from the Threat Motion Analysis Module 416 to the Track History Database 426. Each track is assigned a priority by a queuing algorithm that continuously compares the threat status of each track relative to other tracks in the database 426. Several different approaches can be used to rank track priority. One approach is to rank tracks according to the range and velocity of each subject in the video field of view 308. Subjects that are closer to the protected area and are closing at a faster rate are assigned the highest priority in the queue. Tracks associated with subjects that are exiting the field of view 308 of the WFOV camera 306 are assigned a low priority and eventually dropped from the queue when the subject leaves the field of view.

The Track Priority Queue and Scan Pattern Generator Module 422 extracts heading and velocity estimates associated with the top track in the queue and commands the position controller 442 in Module C to steer the radar antenna 108 to point at the subject 110. As best shown in FIG. 5, a trigger pulse 504 is sent from the Track Priority Queue and Scan Pattern Generator Module 422 to the radar transceiver 106 to initiate a sequence of radar pulses illuminating the subject 110 and collect scattered radar signatures td determine the presence or absence of hidden threat objects 112 on the subject 110. The nominal distance R within which the System 100 can detect a threat object 112 is one hundred meters.

Depending on the accuracy of the location estimates provided by the Motion Tracker Module 412, there are several approaches for managing the handoff between video and radar. In the current embodiment, the Position Control Module 442 is configured to scan over a narrow sector of angles centered about the heading obtained from the Motion Tracker 412. A sequence of radar returns is collected at step 444 over the sector 118. Each radar return is collected, digitized and sent through a composite binary hypothesis test 448 to determine if the return is consistent with clutter or a human subject.

In the preferred embodiment a two-parameter, constant false-alarm (CFAR) algorithm is implemented in the software of processor 302 to test for human return versus clutter. Upon a determination of "clutter", the radar is commanded to the next position in the designated sector. As previously disclosed, the CFAR test operates on a collected RF signature of a target, the RF signature comprising a pair of complex-valued radar impulse response measurements, the co-polarized response, VV and the cross-polarized response, VH. (Note that VV=VV (k,r) and VH= VH(r) where k is the pulse number and r is the range along the radar line of sight from the radar to the far end of the region under surveillance.) For the CFAR test, the squared magnitude of each signal is computed and then summed to obtain an estimate of the total scattered energy as a function of range, i.e., $|VV|^2+|VH|^2$.

Note that in a fully-polarimetric system the corresponding quantity would be referred to as the polarimetric span, $|VV|^2+|VH|^2+|HV|^2+|HH|^2$. For the two-parameter CFAR algorithm we slide two local windows along the range dimension of $|VV|^2+|VH|^2$, a "target" window and a "background" window. The average signal energy is then computed over each window at each range shift and forms the ratio between the target and background averages. Ratios that fall below a predetermined threshold are classified as clutter and are dropped from further processing. Ratios that exceed the threshold are classified as "not clutter" and the corresponding radar measurements (VV and VH) are forwarded to the feature extraction module 454. The optimal window sizes and clutter threshold are a function of the radar system design and operating environment. Typically, one selects the target window to be approximately the same length as the range extent of a human subject.

As an example, for a one-foot resolution radar with an over-sampling factor of 2:1, one skilled in the art would expect the range extent of a person viewed from the side at ground level to be 2–3 feet, or 4–6 samples. The background window size is typically chosen to be greater than or equal to the target window size, with the goal that it be smaller than any background inhomogeneities to avoid problems with estimating spatially-varying background statistics.

Previously we had disclosed how the presence of hidden threat devices on the human body induces a change in the polarization state or radiofrequency energy scattered off of the body. In the preferred embodiment, the Extract RF Discriminant Module 454 computes the polarization energy ratio:

$$rho(k,r)=<|VV(k,r)|^2>/<|VH(k,r)|^2>,$$

over peak regions detected by the CFAR algorithm. In the preferred embodiment we use a local window that is the same size as the CFAR target window. The quantity rho(k,r) is then forwarded to the Associate Track module 424 where it is associated with one or more of the tracks in the Track History database 426.

The beamwidth of the radar and required accuracy required to hit a human-sized object at one hundred meters is equal to the width of the radar beam, which is about 0.5 degrees. A typical video tracking system, however, can have a pointing error that is on the order of 2–3 degrees. Thus, in the initial handoff from video to radar, the radar system will need to "reacquire" the target by performing a fine search about the heading provided by the video system. Once the target has been reacquired, the new signature is compared with previous signatures from that track and an accumulated statistic is calculated.

Radar target reacquisition is accomplished by scanning the radar beam 118 in azimuth along the error diameter of the cued video heading. At 50 m–100 m ranges a 6' tall person is between two and four radar beamwidths high. Therefore, by notionally scanning the radar at two or three different elevation angles, the System can separate upper body returns from legs and feet. At each elevation and azimuth location a radar pulse is collected and examined for the presence of a large-amplitude return along the range dimension by utilizing a cell-averaging, two-parameter, constant false-alarm rate (CFAR) detection algorithm. The statistic is a local signal-to-noise (SNR) estimate and consists of the ratio between a local signal mean within a window centered at, divided by the average background level estimated from regions outside the window. Large local SNR measurements indicate the possible presence of a target at time delay in the radar beam 118.

After the target 110 has been reacquired by the radar, a classification algorithm is applied to separate threat signatures from normal chest response signatures. As tracks and associated radar returns are accumulating in the track history database, the evidence accrual module 428 continuously polls each track and constructs a running detection statistic.

In the preferred embodiment, the evidence accrual module 428 computes a running sum of polarization ratios for each track. For the $j^{th}$ track in the database, this statistic is:

$$phi(j)=\text{Sum}\{\text{pulse } k \text{ in track } j\}rho(k,r)$$

A sequential hypothesis test 430 is then applied to each track statistic:

$$tau(j)=+1, phi(j)>T2, \text{else}$$

$$tau(j)=0, T1<phi(j)<=T2$$

$$tau(j)=-1, phi(j)<=T1$$

Three outcomes are possible: "threat" (yes, or tau(j)= +1), "non-threat" (no, or tau(j)=−1), "insufficient evidence" (?, or tau(j)=0). Tracks declared "non-threat" are marked and maintained in the track history database 426 to allow for eliminating conflicts in the case of overlapping tracks or occlusions. Tracks for which there is insufficient evidence to declare "threat" or "non-threat" are maintained and the evidence accrual process 428 is continued until a definitive "threat" or "non-threat" declaration can be made 430. Tracks declared "threat" are sent to the operator for intervention action as shown in Block D. As with the CFAR test, thresholds T1 and T2 are pre-determined. In the preferred embodiment, these thresholds are set by the operator and/or preset prior to deployment in order to achieve a desired detection versus false-alarm rate and to incorporate the cost of waiting to collect additional sample data. Note that tau(j) also has an implicit time variable, "t" which represents the time-length of the track. A further embodiment would incorporate time dependence into the thresholds, i.e., $T1=T1(t)$ and $T2=T2(t)$, to account for scene dynamics or time-varying statistics.

Block C represents an enhancement to the video-radar cued embodiment which contemplates the use of an optional narrow field of view (NFOV) camera 304 that is co-boresighted with the radar beam 118 under command of the Position Control Module 442. In step 446 the NFOV camera 304 collects high-resolution, zoomed-in video 310 of the object in the current track under interrogation. Video from the NFOV camera 304 is processed to extract estimates of the subject body pose 450. Pose and position estimates obtained from the NFOV camera 304 are compared with the nominal heading information provided by the WFOV camera 306. If the radar/video sensors are deemed to be out of alignment with the subject of their "gaze", a correction vector is generated and forwarded to the Position Control Module 442 and the position of the system is updated until the radar antenna 108 and NFOV 304 camera are aligned on the subject 110. Once alignment is achieved, radar discriminants are extracted from the radar signature 454 and combined with estimated pose information in the track history database 426. Evidence accrual proceeds as before and three outcomes, "threat", "non-threat" and "insufficient evidence" are possible.

Regardless of whether a single WFOV camera 306 is used, or a combination of WFOV 306 and NFOV 304 cameras are deployed, in the event of a "yes" decision from the HCE threat determination logic 430, the corresponding threat declaration and track information is passed at step 432 to the operator console 120 or to an optional wireless display device 122. The information displayed on the operator console 120 includes video data and associated radar statistical evidence. Based upon this data, an interdiction response can be initiated 434. Forms of response can vary from automated triggering of a mitigation system, such as automated notification of first responders to more proactive activities, e.g., the aiming, arming and firing of a high-powered water cannon, 94 GHz. active denial radar, or similar non-lethal weapon.

Additionally, video information can be forwarded to first responders in the field to provide visual information to aid in identification and apprehension of the threat subject 110.

Figure 9:
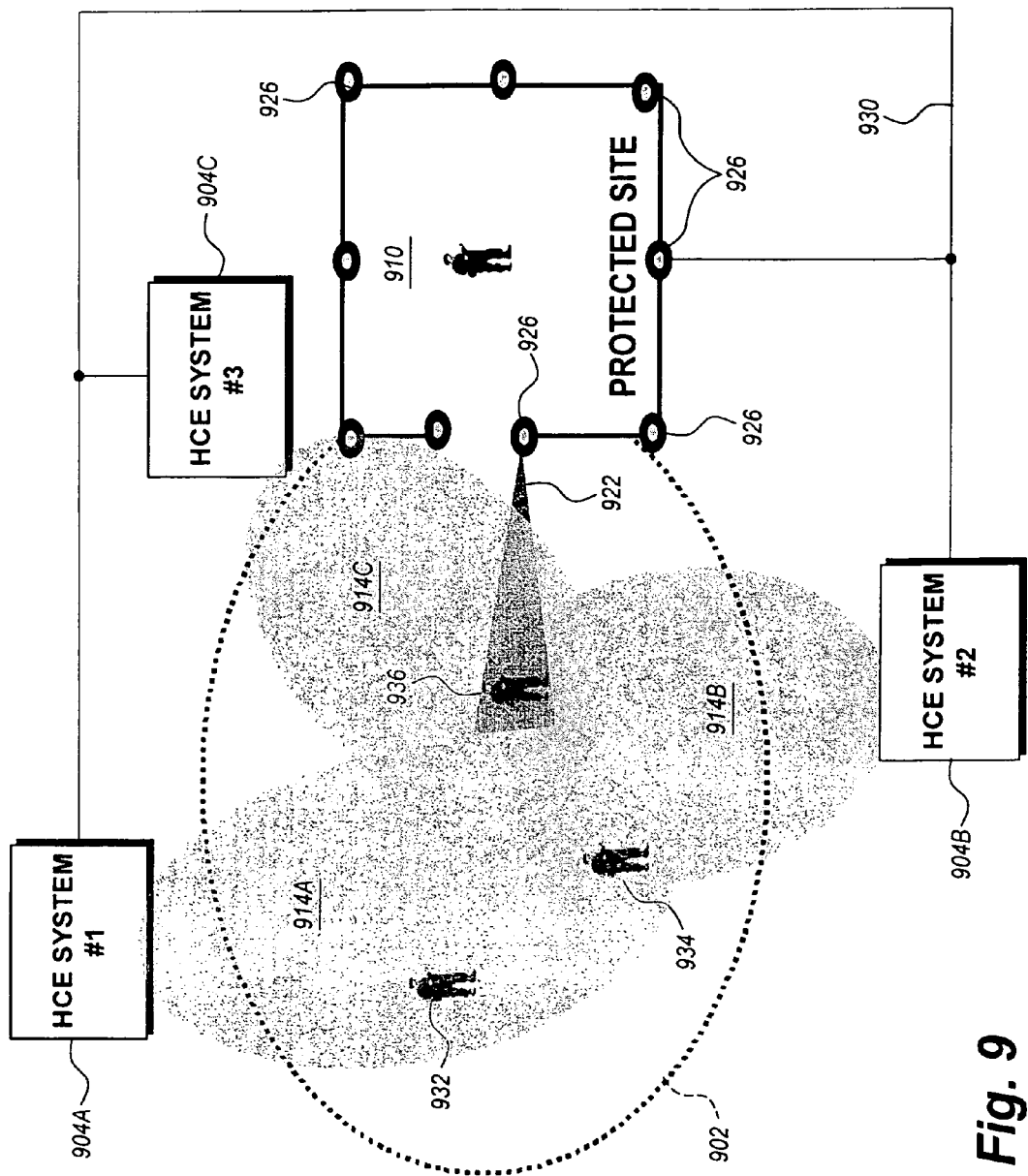
FIG. 9 is a block diagram of a network of HCE detection systems according to the present invention showing the use of multiple radar fields of regard for detection over a wide area of surveillance.

FIG. 9 illustrates an application in which a plurality of HCE Detection Systems 904A–904C collaborate to protect a specific site 910. As shown, HCE Detection Systems 904A–904C are networked together to form a collaborative detection and tracking system in order to achieve improved detection and false alarm rejection within an area under surveillance 902. In order to coordinate surveillance between multiple HCE detection systems, each System 904A, 904B and 904C must be connected to a wideband network 930. Threat mitigation devices 926 in communication with and under control of the HCE Detection Systems operate to neutralize the threat 936 with a water cannon or active radar beam 922. The network 930 may be a hardwired or wireless network.

Collaborative tracking and detection can be implemented in several ways. In one implementation, inter-computer communication coordinates the detection and tracking of potential targets 932, 934, and 936 by overlapping the radar field of regard 914A–914B of each system 904A–904B. The resulting measurements of the RF signatures are combined to achieve simultaneous views of the field of regard from different look directions to increase the validity of the resultant threat determination. In multiple system, collaborative mode, feature-based tracking has been implemented to associate space-time coordinates and subject appearances as the threat passes through crowds having occluded regions.

A second implementation of a collaborative network of HCE detection systems can be used to expand the area of surveillance 902 by linking HCE radar systems 904A–904C having non-overlapping fields of regards (not shown). Inter-system communication would coordinate the detection and tracking of potential human carried explosives over the union of the system wide fields of regard. Feature-based tracking would associate space-time coordinates and appearances of subjects that move from one system field of regard to another system's field of regard. Decision processing and treat mitigation, performed centrally or decentralized at the individual system level would detect and classify the nature of the threat, and as heretofore disclosed, neutralize threat 936 as necessary.

The radar system is comprised of relatively low cost, commercially available components. Furthermore, the specific radar system deployed is not limited to the specific embodiments heretofore disclosed. In the preferred embodiment, the radar system is similar to radar-controlled automobile cruise control systems having a center frequency of about 77 GHz. and has a nominal range of approximately one hundred meters. Non-limiting, the radar system may operate at different or multiple frequencies, including the Ka-band, the W-band, UHF, and UWB frequencies. Furthermore, the radar system need not be comprised of a Frequency Modulated Continuous Wave (FMCW) real beam radar. An alternate radar system may consist of a linear chirp waveform.

Furthermore, an alternative to the previous embodiments 100 and 300, in which the radar transmitter is collocated with the radar receiver, would entail a multi-static system in which one or more receivers is mounted apart from the one or more transmitters.

It is to be understood that the present invention is not limited to the embodiments described above, but encompasses any and all embodiments within the scope of the following claims.

We claim:

1. A system for standoff detection of human carried explosives (HCE) within an area under surveillance, comprising:
   an active radar system, the radar system having a radar transmitter, a radar receiver, at least one radar antenna, and a field of regard;
   a radar tracking control system in physical cooperation with the active radar system, wherein the field of regard of the active radar system is targeted within the area under surveillance, the area of surveillance being greater than the radar field of regard;
   a user interface having a video display terminal and a data input means;
   a computer in electrical communication with the radar system, the radar tracking control system, and the user interface, the computer having a central processing unit, a memory and computer readable program code stored in the memory, the code including:
      radar tracking instruction means for targeting the radar system; and
      HCE detection instruction means for detection of human carried explosive devices.

2. The system according to claim 1, wherein the radar tracking control system further includes:
   a support structure;
   a sensor platform adjustably mounted to the support structure, the radar system mounted to the sensor platform; and
   a sensor platform adjusting means for controlling the pan/tilt orientation the sensor platform, the sensor platform adjusting means being in electrical communication with the computer.

3. The system according to claim 2, further comprising an imaging system in electrical communication with the computer, the imaging system having a field of regard spatially and temporally overlapping the radar system field of regard, the imaging system having at least one video output signal electrically connected to the computer.

4. The system according to claim 3, wherein said computer readable program code further comprises means for detecting and tracking a moving human target from the video output signal, the system for standoff detection further comprising means for controlling said imaging system to maintain the track of the moving human target.

5. The system according to claim 3, wherein the imaging system includes:
   a wide field of view (WFOV) video camera mounted to the support structure, the WFOV camera having a field of regard encompassing the area of surveillance; and
   a variable zoom narrow field of view (NFOV) video camera having a field of regard, the NFOV camera being mounted to the sensor platform, the NFOV camera being boresighted with the radar system, whereby the field of regard of the WFOV camera overlaps the field of regard of the NFOV camera.

6. The system according to claim 5, wherein the code further comprises threat motion detection instruction means for determining the threat potential of a target based upon the motion of the target.

7. The system according to claim 5, wherein the code further comprises sequential hypothesis testing instruction means for fusing radar measurements over multiple observations of the target.

8. The system according to claim 1, further comprising an imaging system producing an output signal connected to said computer, the imaging system being selected from the group consisting of Ladar, Lidar, infrared, multispectral, hyperspectral, imaging radar, and visible light range video.

9. The system according to claim 8, wherein said computer readable program code further comprises means for detecting and tracking a moving human target from the output signal of said imaging system, the system for standoff detection further comprising means for controlling said imaging system to maintain the track of the moving human target.

10. The system according to claim 1, wherein the radar system has at least one transmit polarization and at least one receive polarization.

11. The system according to claim 10, wherein the radar system has an orthogonal pair of transmit polarizations.

12. The system according to claim 10, wherein the radar system has an orthogonal pair of receive polarizations.

13. The system according to claim 1, wherein the field of regard has a range between about fifteen meters and two hundred meters.

14. The system according to claim 1, further comprising a portable wireless handheld console in electrical communication with the computer.

15. The system according to claim 1, wherein the code further comprises:
   classifying instruction means for classifying the composition of the human carried explosive; and
   filtering instruction means for rejecting false alarm events.

16. The system for standoff detection of human carried explosives according to claim 1, further comprising a threat-mitigating device in communication with the computer.

17. The system for standoff detection of human carried explosives according to claim 1, further comprising a threat interdiction system in communication with said computer.

18. The system for standoff detection of human carried explosives according to claim 17, wherein the threat interdiction system includes a water cannon controlled by said computer.

19. The system for standoff detection of human carried explosives according to claim 18, wherein said threat interdiction system includes an active denial radar system controlled by said computer.

20. The system according to claim 1, wherein the computer is communicatively linked to a computer network.

21. The system according to claim 1, wherein the radar system operates with a center frequency between about 10 GHz and 110 GHz.

22. A method for the standoff detection of human carried explosives (HCE) within an area of observation, comprising the steps of:
cueing at least one radar system at a field of regard containing at least one human target;
collecting RF signature data for the at least one human target;
measuring radar signature changes associated with the interaction between radar signatures of the at least one human target and an explosive device carried by the at least one human target;
statistically combining radar signatures over multiple observations of the at least one target;
determining the threat status of the target; and
providing the data to a user interface.

23. The method according to claim 22, further comprising the step of manually targeting the human target with a narrow field of view (NFOV) video camera boresighted to the radar field of regard.

24. A method for the standoff detection of human carried explosives (HCE) within an area of observation using a plurality of HCE detection systems, each HCE system having a radar system, a radar field of regard, an imaging system, and a computer, the method comprising the steps of:
communicatively linking together the plurality of HCE detection systems;
overlapping the radar field of regard of the plurality of HCE detection systems;
creating a plurality of simultaneous radar signatures of the radar field of regard from different look angles;
determining the threat potential of a target based upon the combined data of the plurality of radar signatures.

25. A method for detecting explosive devices, the method comprising the steps of:
illuminating a candidate threat with polarized radiation;
collecting a first reflected radiation from the candidate threat, the first reflected radiation having a polarization identical to that of the illuminating radiation;
collecting a second reflected radiation from the candidate threat, the second reflected radiation having a polarization orthogonal to that of the illuminating radiation; and
detecting the change in polarization state induced by the candidate threat.

26. The method for detecting explosive devices according to claim 25, further comprising the step of processing multiple measurements, of reflected radiation taken over a predetermined period of time.

27. The method for detecting explosive devices according to claim 25, wherein the step of detecting the change in polarization state further includes the step of measuring and calculating a ratio between the received co-polarized return energy divided by cross-polarized return energy accumulated over the predetermined period of time.

28. A system for standoff detection of human carried explosives (HCE) within an area of surveillance, comprising:
(a) detecting means for repetitively scanning the area of surveillance and for detecting and tracking a human target within the area of surveillance;
(b) a radar transmitter for transmitting a narrow beam of polarized electromagnetic radiation;
(c) focusing means for automatically focusing and triggering the beam of polarized radiation emitted by the transmitter onto at least a portion of the human target detected by the detecting means;
(d) a radar receiver for receiving a portion of the beam transmitted by the radar transmitter reflected from the human target and polarized orthogonal to the transmitted beam;
(e) a data storage device having target reference data stored thereon, including radar signatures corresponding to humans with and without explosives carried on their person;
(f) computing means for continuously comparing a reflected beam received by the radar receiver to the reference data to determine when the human target is carrying explosives and for continuously assessing the target detection and tracking data to determine a threat level; and
(g) alarm means for alerting an operator of the system when the threat level determined by the computing means exceeds a threshold.

29. The system for standoff detection according to claim 28, wherein said detecting means comprises a scanning radar.

30. The system for standoff detection according to claim 28, wherein said detecting means comprises at least one visible light range video camera.

31. The system for standoff detection according to claim 30, wherein said at least one camera comprises a wide field of view camera and a narrow field of view camera.

32. The system for standoff detection according to claim 28, wherein said detecting means comprises an imaging system selected from the group consisting of Ladar, Lidar, infrared, multispectral, hyperspectral, imaging radar, and visible light range video.

33. The system for standoff detection according to claim 28, wherein said focusing means comprises a two-axis pan and tilt gimbal and a platform mounted on the gimbal, said detecting means comprising an imaging sensor mounted on the platform, said radar transmitter and said radar receiver including an antenna system mounted on said platform and co-boresighted with said imaging sensor.

34. The system for standoff detection according to claim 28, wherein said detecting means comprises at least one camera, said focusing means comprising:
a two-axis pan and tilt gimbal;
a platform mounted on the gimbal, said radar transmitter and said radar receiver including an antenna system mounted on said platform; and
a controller connected to the gimbal and to the detecting means, the controller being programmed to pan and tilt the gimbal according to a time, frame, and location determined by said detecting means.

35. The system for standoff detection according to claim 28, wherein said radar transmitter transmits a beam of radiation having a millimeter wavelength.

36. The system for standoff human detection according to claim 28, wherein said radar transmitter and said radar receiver comprise separate modules.

37. The system for standoff detection according to claim 28, wherein said radar transmitter and said radar receiver are combined to form a transceiver.

38. The system for standoff detection according to claim 28, wherein said radar transmitter and said radar receiver comprise a cross-polarized system having vertical polarization in transmit and horizontal polarization in receive.

39. The system for standoff detection according to claim 28, wherein said radar transmitter and said radar receiver comprise a cross-polarized system having horizontal polarization in transmit and vertical polarization in receive.

40. The system for standoff detection according to claim 28, wherein said radar transmitter and said radar receiver comprise a fully polarized system.

41. The system for standoff detection according to claim 28, further comprising means for interdicting the human target when the threat potential exceeds the threshold.

42. A method for the standoff detection of human carried explosives (HCE) within an area of observation using a plurality of HCE detection systems, each HCE system having a radar system, a radar field of regard, an imaging system, and a computer, the method comprising the steps of:
communicatively linking together the plurality of HCE detection systems;
coordinating the radar field of regard of the plurality of HCE detection systems to encompass a range of interest;
creating a plurality of simultaneous radar signatures of the radar field of regard from different look angles;
determining the threat potential of a target based upon the combined data of the plurality of radar signatures.

43. The method for the standoff detection of human carried explosives (HCE) according to claim 42, wherein said coordinating step further comprises overlapping at least two of the HCE detection system radar fields of regard, said determining step further comprising collating and contrasting views of the same radar field of regard taken from different look angles.

44. The method for the standoff detection of human carried explosives (HCE) according to claim 42, wherein said coordinating step further comprises spacing at least two of the HCE detection system radar fields of regard apart sequentially, said determining step further comprising collating and contrasting views of the radar field of regard taken from sequential fields in order to evaluate the threat potential.

45. The method for the standoff detection of human carried explosives (HCE) according to claim 44, wherein said sequential fields are abutting.

46. The method for the standoff detection of human carried explosives (HCE) according to claim 44, wherein said sequential fields are spaced apart from each other by an interval.

* * * * *